United States Patent [19]
Schilling

[11] 3,977,428
[45] Aug. 31, 1976

[54] VACUUM SEALING APPARATUS

[75] Inventor: Ernst Schilling, Erlangen, Germany

[73] Assignee: Siemens Aktiengesellschaft, Munich, Germany

[22] Filed: July 20, 1975

[21] Appl. No.: 600,371

[30] Foreign Application Priority Data
July 30, 1974 Germany............................ 2436643

[52] U.S. Cl.................................. 137/340; 285/41; 285/353
[51] Int. Cl.².......................................... F16K 49/00
[58] Field of Search................. 137/340; 251/331; 285/41, 353, 356, 374

[56] References Cited
UNITED STATES PATENTS

| | | |
|---|---|---|
| 1,527,310 | 2/1925 | Kinzbach .............................. 285/41 |
| 2,356,351 | 8/1944 | Phillips ................................. 285/41 |

Primary Examiner—Henry T. Klinksiek
Attorney, Agent, or Firm—Kenyon & Kenyon Reilly Carr & Chapin

[57] ABSTRACT

A vacuum tight seal is obtained at the end of a glass or quartz ampule by apparatus comprising a threaded piece of Teflon slipped over the end of the ampule and a termination member of glass with matching threads having means for coupling to other apparatus and an optional cooling jacket screwed onto said threaded piece with a seal means made up of silicone rubber U-rings with interposed spacer rings of Teflon therebetween. An optional diaphram valve made of polyvinyl chloride and having a diaphram member of fluoroelastomer is also shown.

10 Claims, 3 Drawing Figures

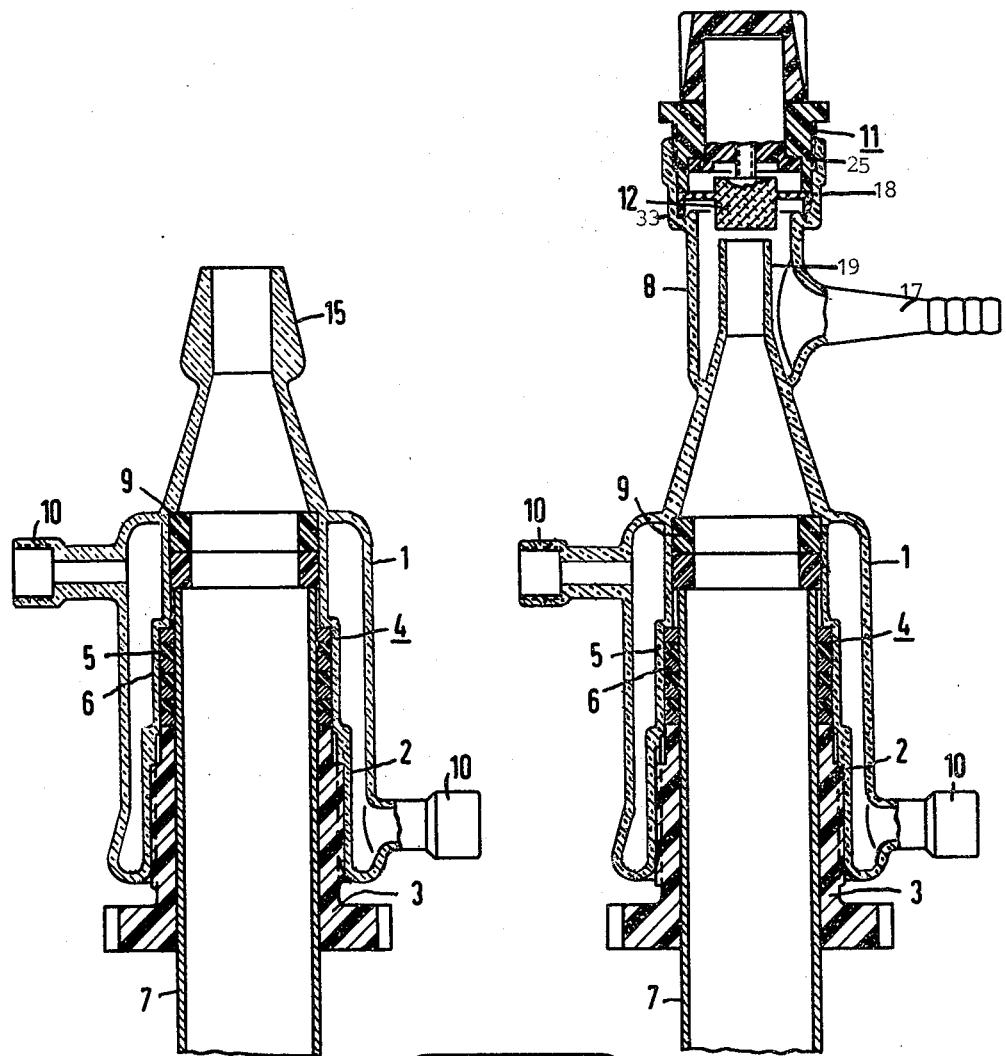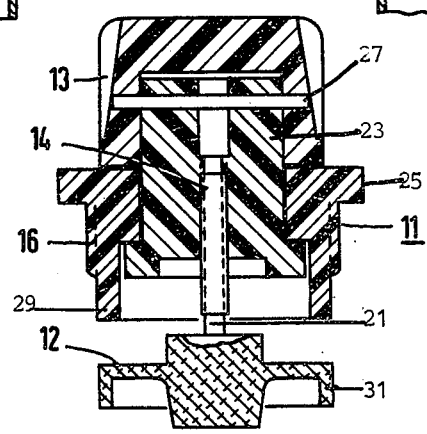

VACUUM SEALING APPARATUS

BACKGROUND OF THE INVENTION

This invention relates to the sealing and joining of glass and quartz ampules in general and more particularly to an improved vacuum tight seal for use in such ampules.

Quartz and glass ampules are often used in chemical synthesis such as in the preparation of AIII-BV compounds for use in semiconductors. In such ampules, which are quite often evacuated, tight joints are required. Such is a necessity particularly where such ampules, typically of quartz, are used in the preparation of semiconductor compounds. Various means of sealing exist in the prior art none of which are satisfactory. For example, ground joints may be used. However, particularly with larger joint diameters these present difficulties. It is often difficult to open such a joint. Sawing off the ampule to open it can lead to disturbing vibrations. If joint grease is used contamination of the inside of the ampule may result. Thus, the use of ground joints and the use of joint grease is not satisfactory in such applications. In view of this the need for an improved apparatus for sealing becomes evident.

SUMMARY OF THE INVENTION

The present invention provides such improved sealing apparatus making possible the sealing of quartz and glass ampules without the use of ground joints such that a high vacuum can be established and maintained therein. The apparatus of the present invention is such as to not contaminate the material within the ampule, a necessary requirement in the synthesis of semiconductor materials. Specifically, the present invention provides a simple device which is realiable and permits effortless and reliable sealing of ampules and permits connecting such ampules to other apparatus such as apparatus for drawing and maintaining a high vacuum without damage to the apparatus.

In essence, the present invention accomplishes this through a sealing apparatus which includes a threaded cylindrical piece of elastic heat resistant plastic which is slipped over the end of the ampule, a threaded termination member of glass screwed on to the plastic piece to provide a connection to other apparatus and sealing means made up of tongue and groove members, i.e., made up of U-rings and spacer rings.

Preferably, to prevent over heating of the glass termination member, which comprises the heart of the device, a cooling jacket is provided surrounding this part. In the sealing arrangement made up of the U-rings and sealing rings, the U-rings will preferably be a material with a sure hardness of about 30A such as silicone rubber. The spacer rings will preferably be of a material such as Teflon. With this arrangement, quartz ampules up to a diameter of 50 to 100 mm in and diameter tolerance of +1.5 mm can be secured in a vacuum tight manner for high vacuums.

In a further embodiment of the present invention a diaphragm valve is provided. This valve includes a diaphragm member made of an elastic plastic material such as a fluorelastomer. The remaining portions of the valve are made of a less plastic, dimensionally stable material such as polyvinyl chloride (PVC). The diaphragm valve of the present invention provides easy handling and allows connections without vibration. The force required for opening and closing a diaphram valve is substantially smaller than that required in operating a vacuum cock of the same size. In addition, the diaphragm valve of the present invention can be used alone in other applications such as a cooling trap.

The primary advantage of the present invention resides in the fact that it makes possible the connection of quartz and glass ampules to pumping installations such as high vacuum pumping installations without the use of ground joints and fusing even for quartz ampules having a diameter of up to about 100 mm. Furthermore, lubricants and other contaminating sealing means are not required. The ampules filled with material to be synthesized can be connected to the high vacuum installation in a simple manner and can be disconnected therefrom without danger. The placing, fixing and removing the ampule made of quartz or glass and without joints is simple and the connection is vacuum tight even for high vacuums. This permits economical operation particularly when preparing semiconductor material such as gallium arsenide.

BRIEF DESCRIPTION OF THE DRAWINGS

FIG. 1 is a cross-sectional view of a first embodiment of the present invention in which the apparatus terminates in a ground joint connection.

FIG. 2 is a similar view of a further embodiment of the present invention which has installed a diaphragm valve.

FIG. 3 is a more detailed drawing of the diaphragm valve of FIG. 2.

DETAILED DESCRIPTION OF THE PREFERRED EMBODIMENT

The sealing apparatus of the present invention consists of three primary elements. These are a threaded termination member 2 of glass, a threaded cylindrical part 3 of an elastic heat resistance material, and a sealing and packing means 4. The cylindrical part 3, which will preferably be polytetrafluorethylene, commercially available under the trade name Teflon, or copolymers of tetrafluorethylene and hexafluropropylene is slipped over the end of the quartz or glass ampule 7. Also slipped over and abutting the threaded part 3 are a plurality of rings making up the sealing means 4. These include two types of rings. Rings 5 are silicone rubber U-rings. In other words, they are rings containing a grooved portion. Alternating therewith are spacer rings 6 preferably of a plastic have a polytetrafluoroethylene base, i.e., Teflon. With these rings in place and with an addition thereto, stop rings 9 placed within the termination member 2, the member 2 is screwed on to the part 3. As this occurs, the sealing means 4 are compressed, the rings 6 fitting into the grooves in the U-rings 5 causing an expansion thereof to result in a vacuum tight seal between the termination member 2 and the ampule 7. The stop rings 9 will be preferably be made of a material which is elastic and heat resistant. e.g. they may also be of Teflon. The termination member 2 will preferably be made of glass having high mechanical strength. As illustrated, the portion of member 2 which screws on parts is surrounded by a cooling jacket 1 for removal of heat and protection thereof. The jacket contains inlet and outlet connections 10 for cooling water or the like in the form of screw joints. The termination member 2 terminates with a ground extension 15 of glass which is used as the connecting element to the vacuum pump installation. Once the sealing apparatus of the present invention is installed on the end of the ampule, the ampule may be evacuated and the necessary synthesis carried out. On completion thereof removal of the sealing apparatus to permit removal of the synthesized material within the ampule takes place in a simple manner through a reversal of the installation process. The termination member 2 need only be screwed off to present an opened ampule from which the synthesized material can be removed. The difficulties associated with the prior art apparatus including the necessity in some cases of cutting the ampule are no longer present. Furthermore, none of the materials used are contaminated by any materials used as is the case with the grease typically used with ground glass.

A further embodiment of the present invention is illustrated on FIG. 2. The connection between the ampule 7 and the termination member 2 is exactly as described in connection with FIG. 1 and will not again discussed. In this case, however, rather than terminating in a ground glass connection the termination of the termination member 2 is made with a diaphragm valve head 8 also of high strength glass on which is installed valve 11. Valve head 8 includes an other cylindrical portion 18 for accepting the body 25 of valve 11 and an inner concentric cylindrial portion 19 forming a seat for the diaphragm member 12 of valve 11. As illustrated on FIG. 2, the diaphragm valve is open permitting evacuation through a vacuum outlet line 17. Once the desired vacuum is reached in the diaphragm member 12 will be displaced in a manner to be described below to abut against the internal cylindrical portion 19 seating thereon to seal the ampule. The manner in which this occurs can best be seen with reference to FIG. 3. The diaphragm valve is made up of a diaphragm member 12 which will preferably be made of a fluoroelastomer such as that available under the trade name Viton. The diaphragm member 12 is secured to the end of a threaded screw 21 which threads into a valve spindle 14. The valve spindle is secured within a member 23 rotatable within a body member 25. Rotation is accomplished by means of a control knob 13 which is secured to the rotatable member 23 by means of a pin 27. Thus, rotation of the control knob 13 will result in rotation of the member 23 and spindle 14 to permit moving the diaphragm member 12 up and down. The body member 25 contains screw threads 16 which screw into appropriate matching threads on the portion 18 of valve head 8 of the termination member 2. As illustrated by FIG. 2, when member 25 is screwed into place, its lower edge 29 abutts against the diaphragm 12 causing the depending flange 31 thereof to abut against and be held tightly in a groove 33 in the valve head 8. With the diaphragm member 12 so secured against rotation, turning of the control knob 13, which in turn will result in the spindle 14 turning, will cause the shaft 21 coupled to the diaphragm member 12 to move up and down to move the diaphragm valve in and out of seating contact with the cylindrical portion 19. As a result, with the diaphragm valve in the position shown on FIG. 2, the ampule 7 can be evacuated to the desired degree. Once this occurs, the control knob 13 is turned to seat the diaphram member 12 against the portion 19 to establish an excellent seal. Note, that this seal depends not only on pressure exerted the shaft 21 but is aided and increased by the difference in pressure above and below the diaphragm member 12. The pressure above the diaphragm member 12 will be atmospheric pressure whereas the pressure below will be the vacuum pressure. Thus, an excellent seal is maintained. Furthermore, because of the pressure differential the operating force required to close the valve is minimal.

Thus, an improved sealing apparatus for quartz or glass ampule which avoids problems associated with prior art sealing means has been shown. Although specific embodiments have been illustrated and described, it will be obvious to those skilled in the art that various modifications may be made without departing from the spirit of the invention which are intended to be limited solely by the appended claims.

I claim:
1. Apparatus to be joined to the end of an ampule to provide sealing which can withstand a high vacuum comprising:
   a. a heat resistant cylindrical threaded part disposed over the end of the ampule;
   b. a threaded termination member of glass and including means for coupling to other apparatus screwed onto said heat resistant threaded part; and
   c. sealing means in the form of a plurality of rings exhibiting a tongue and groove action disposed between the ampule and said termination member and arranged to be compressed as said termination member is screwed onto said heat resistant cylindrical threaded part.

2. Apparatus according to claim 1 and further including a cooling jacket surrounding said termination member.

3. Apparatus according to claim 2 wherein said termination member, cooling jacket and coupling means are made of a glass of high mechanical strength.

4. Apparatus according to claim 1 wherein said sealing means comprise a plurality of U rings of a material with a Shore hardness of at least 30A having therebetween spacer rings of a harder material.

5. Apparatus according to claim 4 wherein said cylindrical threaded part, and spacer rings are made of the same elastic heat resistant material and further including stop rings disposed between the end of the ampule and said termination member also made of the same material.

6. Apparatus according to claim 5 wherein said material is polytetrafluoroethylene.

7. Apparatus according to claim 4 wherein said U rings are made of silicone rubber.

8. Apparatus according to claim 1 wherein the means for coupling of said termination member comprises a diaphragm valve head and further including a diaphragm valve having a body portion made of a nonelastic plastic material and a diaphragm member of an elastic heat resistant plastic material disposed on said valve head, said valve head including an outer cylindrical portion for accepting said body portion and a concentric inner cylindrical portion forming a seat for said diaphragm member.

9. Apparatus according to claim 8 wherein said diaphragm member is made of a fluoroelastomer and said body portion of polyvinyl chloride.

10. Apparatus according to claim 9 wherein said sealing means comprise a plurality of silicone rubber U rings having therebetween spacer rings of polytetrafluroethylene, said cylindrical threaded part is also of polytetrafluoroethylene and further including stop rings disposed between the end of the ampule and said termination member also made of polytetrafluoroethylene.

\* \* \* \* \*